United States Patent [19]

Le Loarer

[11] Patent Number: 5,002,747

[45] Date of Patent: Mar. 26, 1991

[54] PROCESS FOR OBTAINING CERIC OXIDE

[75] Inventor: Jean-Luc Le Loarer, La Rochelle, France

[73] Assignee: Rhone-Poulenc Chimie, Courbevoie, France

[21] Appl. No.: 213,190

[22] Filed: Jun. 29, 1988

[30] Foreign Application Priority Data

Jun. 29, 1987 [FR] France .................................. 87 09122
Jun. 15, 1988 [FR] France .................................. 88 07992

[51] Int. Cl.$^5$ ............................................. C01F 17/00
[52] U.S. Cl. ................................. 423/592; 423/21.1; 423/21.5; 423/263
[58] Field of Search ................. 423/263, 592, 21.1; 427/21.5

[56] References Cited

U.S. PATENT DOCUMENTS

| | | | |
|---|---|---|---|
| 4,231,997 | 11/1980 | Pitts | 423/395 |
| 4,545,923 | 10/1985 | Gradeff et al. | 252/309 |
| 4,601,755 | 7/1986 | Melard et al. | 106/3 |
| 4,647,401 | 3/1987 | Gradeff et al. | 423/21.1 |
| 4,657,644 | 4/1987 | Bachot et al. | 423/263 |
| 4,661,330 | 4/1987 | Chane-Ching et al. | 423/263 |
| 4,663,137 | 5/1987 | Chane-Ching et al. | 423/263 |
| 4,786,325 | 11/1988 | Melard et al. | 106/3 |
| 4,859,432 | 8/1989 | David | 423/21.1 |

FOREIGN PATENT DOCUMENTS

| | | | |
|---|---|---|---|
| 0216687 | 4/1987 | European Pat. Off. | 423/21.1 |
| 60-96527 | 5/1987 | Japan | 423/21.1 |
| 1159886 | 6/1985 | U.S.S.R. | 423/21.1 |

*Primary Examiner*—Peter D. Rosenberg
*Attorney, Agent, or Firm*—Burns, Doane, Swecker & Mathis

[57] ABSTRACT

The present invention concerns a process for obtaining a ceric oxide having a large specific surface area.

The process according to the invention consists of subjecting a ceric hydroxide prepared by hydrolysis of a cerium IV salt solution, to solvothermal treatment prior to calcination.

The ceric oxide thus obtained has a large specific surface area at high temperature.

30 Claims, No Drawings

PROCESS FOR OBTAINING CERIC OXIDE

BACKGROUND OF THE INVENTION

The present invention concerns a new process for obtaining ceric oxide having a large specific surface area at high temperature.

In the following description of the invention, by "specific surface area" is meant the B.E.T. specific surface area, determined nitrogen adsorption in accordance with the ASTM D 3663-78 standard as established based on the BRAUNER-EMMETT-TELLER method described in *The Journal of American Society*, 60, 309 (1938).

It is well known that ceric oxide may be used as a catalyst or catalyst carrier. Mention may be made, for example, of the work of Paul MERIAUDEAU and his colleagues, concerning methanol synthesis, taking $CO + H_2$ as a basis, on catalysts on a plate set on ceric oxide (Reports of the Academy of Sciences, Paris, volume 297 - Series II-471, 1983).

It is also well known that the effectiveness of a catalyst generally increases as a function of the increasing dimensions of the contact surface between the catalyst and the reagents. In order to achieve this, the catalyst must be kept in as divided a state as possible, that is, the solid particles composing it must be as small and individualized as possible. The basic role of the carrier is, therefore, to keep the catalyst particles, or crystallites, in contact with the reagents, in the most divided state possible.

During prolonged use of a catalyst carrier, a reduction of the specific surface area occurs, which is the result of the coalescence of the ultra-fine micropores. During this coalescence, a portion of the catalyst is incorporated into the carrier mass, and may no longer be kept in contact with the reagents.

Up until the present time, most of the ceric oxides that have been prepared give a specific surface area which decreases rapidly under operating temperatures above 500° C. Thus R. ALVERO and colleagues (Journal of the Chemical Society, Dalton Trans. 1984, 87) obtained, using ammonium cerinitrate, a ceric oxide which, after calcination at 600° C., gives a specific surface area of 29 $m^2/g$.

Furthermore, Patent No FR-A 2 599 744 contains a description of a ceric oxide which gives a specific surface area of at least 85±5 $m^2/g$, obtained following calcination at between 350° and 450° C. and, preferably, between 100 and 130 $m^2/g$ after calcination at between 400° and 450° C. Said oxide is prepared by means of hydrolysis of watery ceric nitrate solution in a nitric acid medium; the precipitate obtained is then separated out, washed with an organic solvent, dried if conditions require, then subjected to calcination. The ceric oxide obtained gives a signficiant specific surface area when prepared within a calcination temperature range of from 300° to 600° C. However, a decrease of the specific surface area after calcination at a higher temperature is observed; the specific surface area is 10 $m^2/g$ after calcination at 800° C.

The Patent No FR-A 2 559 755 may also be cited. This details a ceric oxide giving a specific surface area of at least 85±5 $m^2/g$ after calcination at between 350° and 500° C., and is, preferably, between 150 and 180 $m^2/g$ after calcination at between 400° and 450° C. This oxide is obtained according to a process which involves precipitating out a basic ceric sulfate, by reacting a watery ceric nitrate solution with a watery solution containing sulfate ions, separating out the precipitate thus obtained, washing it using a ammonia hydroxide solution, drying it if necessary, and then calcining it at a temperature varying between 300° and 500° C. The ceric oxide thus obtained gives a large specific surface area, but, when subjected to calcination at 800° C., its specific surface area decreases significantly and falls to about 10 $m^2/g$.

In the French Patent Application No 87/09122, the applicant has described a process for increasing and stabilizing at high temperature the specific surface area of a cerc oxide.

This process consists of subjecting ceric hydroxide, precursor of ceric oxide, to solvothermal treatment before calcination.

More particularly, the process described in the abovementioned application involves:

placing the ceric hydroxide in suspension in a liquid medium;

heating it in a closed chamber until a temperature and pressure are achieved which are below the critical temperature and pressure, respectively, of said medium;

cooling the reactive medium and bringing it back to atmospheric pressure;

separating out the ceric hydroxide thus treated;

then calcining it.

By ceric hydroxide is meant a hydrated ceric oxide $CeO_2, 2H_2O$, or a ceric hydroxide that may contain residual quantities of bound or adsorbed anions such as chlorides. sulfates, nitrates, acetates, formates, etc.

A preferred embodiment of the process described in the Patent Application No 87/09122 involves use of a stock solution as a liquid medium for autoclaving.

A process of this kind permits not only an increase in the specific surface area of the ceric oxide obtained, but also preservation of an increased specific surface area up to temperatures of 900° C.

By subjecting a ceric hydroxide, prepared by reacting a cerium salt solution with a base, under certain conditions in the presence of an oxydizing agent and with a pH above 7, to treatment by autoclave in a basic medium, the applicant, according to Patent Application FR 87/09122, proposes a ceric oxide giving a specific surface area at 800°-900° C., which has never been achieved by products described according to the state of the technology.

The ceric oxide thus obtained gives a specific surface area of at least 15 $m^2/g$, measured after calcination at a temperature of between 800° and 900° C. and, preferably, between 20 and 35 $m^2/g$ measured after calcination at a temperature of 800° C.

It gives a specific surface area of between 15 and 150 $m^2/g$ measured after calcination at a temperature of between 350° and 900° C.

In this way, it may give a specific surface area varying between 100 and 150 $m^2/g$ measured after calcination at between 350° and 450° C.

However, when subjected to a higher temperature of up to 900° C. at the time of use, especially in the area of catalysis, it characteristically retains a specific surface area of at least 15 $m^2/g$.

In the present application, the specific surface areas expressed are measured on products which have undergone calcination for at least two (2) hours at the given temperature.

Another characteristic of the ceric oxide, subject of the Patent Application FR 87/09122, is that it gives a porous volume that is above 0.1 cm³/g at a measuring temperature of between 800° and 900° C. and that is, preferably above 0.15 cm³/g.

The porous volume corresponding to pores having a diameter of less than 60 nm (600 Å) is measured using a mercury porosimeter according to the ASTM D4284-83 standard, or by following the nitrogen-adsorption isotherm method, the abovementioned B.E.T. method.

The porous volume, like the specific surface area, is a function of the calcination temperature: it may vary between 0.35 and 0.15 cm³/g for a calcination temperature ranging from 350° to 900° C.

The preferred ceric oxide, subject of the Patent Application 87/09122, gives a porous volume of between 0.15 and 0.25 cm³/g after calcination at a temperature of 800° C.

The size of the pores of a calcined ceric oxide at 800° C. ranges between 3 nm (30 Å) and 60 nm (600 Å): the average diameter ($d_{50}$) of the pores varies between 20 nm (200 Å) and 30 nm (300 Å), preferably around 25 nm (250 Å).

The definition of the average diameter specifies that all pores of a diameter less than the average make up 50% of the total porous volume (Vp) of the pores having a diameter of less than 60 nm (600 Å).

A ceric oxide calcined at 350° C. gives pores with a diameter of from 2 nm (20 Å) to 100 nm (1000 Å): the average diameter varies between 10 nm (100 Å) and 20 nm (200 Å), and is, preferably, around 15 nm (150 Å).

X-ray diffraction analysis shows that the ceric oxide described in Patent Application FR 878/09122, exhibits a crystalline phase of the $CeO_2$ having a mesh parameter ranging from 0.542 nm (5.42 Å) to 0.544 nm (5.44 Å). As a guide, it should be specified that the size of the crystallites of a ceric oxide obtained after calcination at 350° C. ranges from 4 nm (40 A) to 6 nm (60 Å) and, after calcination at 800° C., between 10 nm (100 Å) and 20 nm (200 Å).

SUMMARY OF THE INVENTION

As a result of his continuing research, the present inventors has now succeeded in producing a novel ceric oxide having a specific surface ranging from 20 to 60 m²/g, measured after calcination at a temperature of 800.C, which novel ceric oxide has a specific surface ranging from 70 to 160 m²/g, and preferably from 100 to 160 m²/g, measured after calcination at a temperature of from 350° C. to 450° C.

The present invention has, therefore, as its object a process for obtaining a ceric oxide giving a specific surface area of at least 15 m²/g, as measured after calcination at a temperature of between 800° and 900° C.; This process is characterized by the fact that it involves:

placing in suspension in water, or in a watery decomposablebase solution, a ceric hydroxide corresponding to the general formula (I):

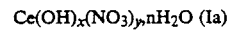  (I)

in which:
x=4−y
the value of y ranges from 0.35 to 1.5
p is more than or equal to 0 and less than or equal to 2.0
n is more than or equal to 0 and less than or equal to about 20.

heating it in a sealed chamber until a temperature and a pressure are achieved which are less than the critical temperature and pressure, respectively, of said medium;
cooling the reactive medium and bringing it back to atmospheric pressure;
separating out the cericm hydroxide thus treated;
calcining it.

The applicant discovered that a ceric oxide having a large specific surface area at high temperature could be obtained by subjecting a ceric hydroxide or a cerium oxide hydrate, obtained by hydrolysis of a cerium IV nitrate salt, to autoclaving in a liquid medium that may be either water or a watery decomposablebase solution.

DETAILED DESCRIPTION OF THE EMBODIMENTS

A ceric hydroxide corresponding to formula (I) thus plays a role in the invention process. This ceric hydroxide is the object of the Patent Application EP-A 0 239 477.

More particularly, this is a cerium IV hydroxynitrate which possesses the capability of being peptized, that is, of giving a colloidal solution when placed in dispersion in water.

As regards the choice of the ceric hydroxide used in the invention process, preference is given to a compound corresponding to formula (I), in which p is equal to 0. It corresponds, preferably, to the following formula (Ia):

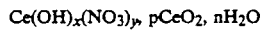 (Ia)

in which:
x is such that x=4−y
the value of y ranges from 0.35 to 0.7
n is more than 0 and less than or equal to about 20.

The greatest preference is given to the use, in the invention process, of a compound corresponding to formula (Ia), in which n is more than 0 and less than about 10.

The ceric hydroxide corresponding to formula (I) and which is used according to the invention, is prepared according to a process consisting of hydrolysis of a watery cerium IV salt solution in an acidic medium, of separation out of the precipitate obtained and, as necessary, of thermal treatment.

In the first step, hydrolysis is carried out in a watery cerium IV salt solution.

For this purpose, one begins with a cerium IV solution, which may be a watery ceric nitrate solution. Said solution may, without prejudice to the process, contain cerium in the cerous state; it is, however, recommended that it contain at least 85% of cerium IV, in order to achieve the optimal precipitation yield.

Choice of the cerium salt solution is made so as to guarantee that it contains no impurities that may reappear in the final product. A cerium salt solution having a degree of purity of above 99% may profitably be used.

Within the framework of the invention, the concentration of the salt solution is not a critical factor. When expressed as a cerium IV solution, it may range from 0.3 to 3 moles per liter, and, preferably, from 0.5 to 1.5 moles per liter.

As regards basic materials, use may be made of a ceric nitrate solution obtained as a result of the action produced by nitric acid on a hydrous ceric oxide prepared in a conventional manner, for example as a result of the action of nitric acid on cerous carbonate and of the addition of a ammonia hydroxide solution in the presence of an oxydizing agent, preferably hydrogen peroxide (oxygenated water).

The ceric nitrate solution obtained according to the process involving electrolytic oxidation of a cerous nitrate solution, which is described in FR-A 2 570 087 (No 84 13641), constitutes a basic material of choice.

The hydrolysis medium is composed of water, the nature of which is not a critical factor, but which is, preferably, distilled or permuted water.

Acidity may be introduced by addition of a mineral acid. The choice of nitric acid is preferable. Use may be made of a concentrated or reduced acid of up to $10^{-2}$ N, for example.

It may also come from the ceric nitrate solution, which may be slightly acidic and possess a normality ranging between 0.01 N and 5 N, but preferably between 0.1 N and 1 N.

The quantity of H* ions introduced for the the purpose of the hydrolysis reaction is such that the molar ratio $[H*]/[Ce^{IV} eq.]$ is greater than or equal to 0 and less than or equal to 3.

Preference is given to the choice of a $[H*]/[CeIV eq.]$ molar ratio of between 0.4 and 2.5.

The proportion of the watery cerium IV salt solution to the hydrolysis medium (mostly water) is such that the final equivalent cerium IV concentration ranges from 0.1 mole/liter to 1 mole/liter, and preferably, from 0.2 to 0.6 mole/liter.

The final equivalent cerium IV concentration is defined by the follwing equation:

$$[Ce^{IV} eq.] = [Ce^{IV}] \times V'/V + V'$$

in which:

$[Ce^{IV}]$ is the concentration in moles/liter of the cerium IV salt solution;

V represents the volume of water to which acid may be added; and

V' represents the volume of the cerium IV solution.

Hydrolysis of the cerium IV salt, carried out under conditions as previously described, takes place at between 70° and 120° C., preferably at the temperature producing reflux of the reactive medium, i.e., at about 100° C.

It is easier to work at the reflux temperature, which is simple to control and reproduce.

The preparation process for the compound according to formula (I) may be implemented using several variants. For example, one may add at one time, gradually, or continuously the cerium IV salt solution in the water which, if required, may contain acid heated to the reactive temperature, or vice versa.

According to a preferred preparation method, the cerium IV salt solution and the hydrolysis medium are mixed, and the mixture, under continual stirring, is heated to the reactive temperature.

The process may also be performed in a continuous manner. For this purpose, the mixture of the cerium IV salt solution and the hydrolysis medium takes place simultaneously and continuously, and the mixture is heated continuously to the desired reactive temperature.

The duration of the hydrolysis reaction may vary between 2 and 8 hours, and preferably, between 3 and 6 hours. At the end of the procedure, the formation of a precipitate is observed.

The yield of the hydrolysis reaction is a function of the final equivalent cerium IV concentration and of the molar ratio $[H]/[Ce^{IV} eq.]$. It will be larger as the reactive medium is made more dilute and the molar ratio $[H*]/[Ce^{IV} eq.]$ is lowered. As an example, it is specified that it will be between 100 and 25% for a final equivalent cerium IV concentration equal to 0.35 mole/liter and a molar ratio $[H*]/[Ce^{IV} eq.]$ of from 0 to 2.5.

The second step of the process consists in separating out, after the reaction, the reactive mass, which exists as a suspension whose temperature is most often found in the range of between 9° and 100° C. This procedure is performed before or after cooling of the reactive mass at room temperature, that is, most often between 10° and 25° C.

The precipitate is separated out according to conventional solid-liquid separation methods: filtration, decantation, spinning, and centrifuging.

The precipitate separated out as a result of hydrolysis may be used in this state in the invention process. In this case, the product obtained corresponds to the formula (Ia):

$$Ce(OH)_x(NO_3)_y, nH_2O \quad (Ia)$$

in which:

x is such that x=4 −y y ranges between 0.35 and 0.7 n is more than 0 and less than or equal to about 20.

The cericm hydroxide defined by the formula (Ia) corresponds to a formula (I) compound, in which p is equal to 0 and n is more than 0 and less than or equal to 20.

Its water content is quite variable; this content depends on the separation technique and the conditions under which separation takes place, for example, the duration of the spinnning of the filtration cake. Generally, the precipitate separated out is a formula-(I) compound in which p is equal to 0, and n is preferably more than 0 and less than 10.

It is also possible to use, within the framework of invention procedures, the ceric hydroxide resulting from thermal treatment of the precipitate separated out.

By subjecting the precipitate separated out to a drying step involving the control of the duration and temperature parameters, by increasing these parameters a ceric hydroxide is obtained corresponding to the formula (Ia), in which p is equal to 0, n is more than 0 and less than or equal to about 20; a ceric hydroxide corresponding to formula (Ib) and corresponding to a formula-(I) compound in which n and p are equal to 0; and a ceric hydroxide corresponding to the formula (Ic), which corresponds to a formula-(1) compound in which n is equal to 0 and p is more than 0.

More precisely, the ceric hydroxide is represented by the formula (Ib), as follows:

$$Ce(OH)_x(NO_3)_y \quad (Ib)$$

in which:

x is such that x=4−y y ranges from 0.35 to 0.7 the cerium content expressed as a % of $CeO_2$ ranges between 77 and 72%.

If the drying conditions are carried farther and if the $CeO_2$ content surpasses 72% for y=0.7, 77% for $y = 0.35$, and a value of between 77 and 72% for y ranging from 0.35 to 0.7, the compound obtained may be represented by the following formula (Ic), which demonstrates the presence of ceric oxide:

$$Ce(OH)_x(NO_3)_y, pCeO_2 \qquad (Ic)$$

in which:
x is such that $x = 4 - y$
y is in the range 0.35 to 1.5
p is greater than 0 and less than or equal to 2.0.

The drying conditions may vary within broad limits. Thus, the temperature may vary between 15° C. and 100° C., preferably between room temperature and 50° C. The duration of the drying should preferably be between 5 and 48 hours, in order to obtain a dry product (n=0). The drying procedure may be done using air-drying or under reduced pressure, for example between 1 and 10 mm of mercury (133.322 Pa and 13333.22 Pa).

Among the various ceric hydroxides corresponding to formula (I), the compound corresponding to formula (Ia) constitutes a basic material of choice for the implementation of the invention process.

In accordance with the present invention, the formula (II) ceric hydroxide, prepared using hydrolysis of a cerium IV nitrate salt, is subjected to autoclaving, before proceeding to calcination.

For this purpose, the ceric hydroxide is used in suspension form in a liquid medium.

Among the liquids that may be used is water. In this case, the formula (I) compound, dispersed in low concentration expressed in terms of $CeO_2$, preferably less than 1 more/liter in a watery medium, produces colloidal dispersion or colloidal solution in which the size of the colloids, as defined by the average hydrodynamic diameter of the colloids, may range between 10 nm (100 Å) and 100 nm (1,000 Å). The average hydrodynamic diameter of the colloids is determined by the quasi-elastic scattering of light, according to the method described by Michael L. McConnell in *ANALYTICAL CHEMISTRY*, 53, No 8 1007 A (1981).

As a liquid medium, use may also be made of a watery medium of a decomposable base, within the parameters for calcination described in the invention.

By decompoundable base is meant a compound with a $pk_b$ of less than 7 and capable of being decomposed within the calcination parameters of the invention.

As an illustration of these latter, one could mention liquid ammonium, urea, ammonimum acetate, ammonium hydrogenocarbonate, ammonimum carbonate, or a primary, secondary, or tertiary amine, such as methylamine, ehtylamine, propylamine, n-butylamine, sec-butylamine, n-pentylamine, 2-aminopentane, 2-amino 2-methyl butane, 1-amino 3-methyl butane, 1,2-diaminoethane, 1,2-diaminopropane, 1,3-diaminopropane, 1,4-diaminobutane, 1,5-diaminopentane, 1,6-diaminohexane, dimethyamine, diehtylamine, trimethylamine, triethylamine, or a quarternary amine, such as, for example, tetra-alkylammonium hydroxide, preferably having alkyl radicals containing 1 to 4 carbon atoms; more especially, use is made of tetramethylammonium hydroxide or tetraethylammoium hydroxide.

A mixture cf bases may also be used.

Preference is given to a ammonia hydroxide or a tetraalkylammonium solution, or mixtures of them.

When the liquid medium is a basic solution, the concentration of this solution is not a critical factor within the framework of the invention. It may vary within broad limits, for example between 0.1 and 11 N; but it is preferable to use solutions whose concentrations vary betweeb 1 and 10 N.

In the liquid medium, the concentration of ceric hydroxide expressed in terms of $CeO_2$ may vary between 0.3 and 6 moles/liter, preferably between 2 and 3 moles/liter.

Autoclaving is performed at a temperature between the reflux temperature and the critical temperature of the reactive medium. Preference is given to the choice of a temperature between 100° and 350° C., and, even more, to one between 150° and 350° C.

raising of the temperature is carried out at a rate which is not a critical factor. The reactive temperature is, for example, achieved by heating for between 30 minutes and 4 hours.

The invention process may be implemented by introducing the ceric hydroxide in suspension into the liquid medium in a sealed chamber; pressure, therefore, results only from heating of the reactive medium.

In the temperature parameters provided above and in a water medium, it may be specified, by way of illustration, that the pressure varies between $1(10^5 Pa)$ and 165 Bars ($165.10^5$ Pa), and preferably between 5 ($5.10^5$ Pa) and 165 Bars ($165.10^5$ Pa).

Outside pressure may also be exerted; this pressure supplements the pressure due to heating.

The duration of the autoclaving is not critical; it may vary between 30 minutes and 6 hours.

At the end of the autoclaving procedure, cooling continues until inertness of the system is achieved, and the system is brought back to atmospheric pressure.

The product in suspension in the liquid medium is separated out using conventional solid-liquid separation methods, such as decantation, spinning, filtration, and/or centrifuging.

The product collected may, if required, be washed, preferably with water, and/or dried under the conditions previously specified.

In accordance with a final step in the invention process, calcination of the product obtained is performed at a temperature of between 300° and 1000° C., preferably between 350° and 800° C.

The duration of the calcination may vary, within broad limits, between 30 minutes and 10 hours, preferably, between 2 and 6 hours.

The implementation of the invention process produces a ceric oxide having a specific surface area of at least 15 m²/g, measured after calcination at a temperature of between 800° and 900° C. The specific surface area of the oxide obtained generally varies between 20 and 60 m²/g, and, more particularly, between 20 and 35 m²/g, measured after calcination at a temperature of 800° C.

The ceric oxide obtained using the invention process gives such a large specific surface area at high temperature, that it is perfectly suitable for use in catalysis, either as a catalyst or catalyst carrier.

It is especially well adapted for use as a catalyst carrier in treatment reactions for exhaust gases from internal-combustion engines.

The following examples illustrate the invention, without, however, being limitative.

Assay A is given for the purpose of comparison; it does not involve autoclaving.

EXAMPLE 1

Assay A

1. Synthesis of ceric hydroxide

In a 2-liter three-necked flask equipped with a thermometer, a stirring device, a system for feeding reagents, a mechanism for ascendant cooling, and also with a heating device, one introduces at 100° C., in 1,425 cm³ of distilled water and in 3 hours:

574 cm³ of a ceric nitrate solution containing 1.18 moles/liter of cerium IV and 0.06 mole/liter of cerium III, and having a free acidity of 0.8 N.

In the hydrolysis medium, the cerium IV concentration, expressed in terms of $CeO_2$, is equal to 60 g/liter and the molar ratio $H^+/Ce^{IV}$ eq. is equal to 0.68.

Stirring and reflux of the reactive medium is kept up for 3 hours.

Filtration is performed according to the BÜchner method.

179 g of a yellow precipitate corresponding to formula (Ia) are collected.

The chemical analysis of the product obtained gives the following chemical composition:

| | |
|---|---|
| loss due to heating = | 39.2% |
| $CeO_2$ = | 60.8% |
| $NO_3^-/Ce^{IV}$ molar ratio = | 0.44 |

Yield from the hydrolysis reaction is determined to be 94%.

2. Autoclaving of the ceric hydrolysis (hydroxide? )

In a 100-cm³, high-form beaker, 30 cm³ of de-ionized water and 30 g of previously-prepared ceric hydroxide are succesively added.

After homogenizing the cericm hydroxide in its medium, the beaker is placed in an autoclave having a usable volume of about 0.5 l.

The mixture is heated to 200° C., or about 16 bars (16.10⁵ Pa), for three hours using an appropriate means of heating.

Upon completion of this hydrothermal treatment, the precipitate is filtered out using the BÜchner method.

Two fractions of this moist product are then subjected to calcination under the following conditions: 2 hours at 350° C. and 1 hour at 800° C.

The specific surface area is determined according to the method specified in the description.

The porous volume corresponding to pores having a diameter of less than 60 nm (600 Å) is measured using a mercury porosimeter according to the ASTM D4284-83 standard or following the nitrogen-adsorption isothermal method, the previously-cited B.E.T. method.

The results obatined are given in Table I. As a comparison, the Table gives the results of a ceric oxide prepared using direct calcination at 350° C. for 2 hours and at 800° C. for 1 hour, and of the ceric hydroxide synthesized under 1 (Assay A).

TABLE I

| | Calcination temperature °C. | Specific surface area - m²/g | Porous volume cm³/g |
|---|---|---|---|
| Example 1 | 350 | 98 | 0.103 |
| | 800 | 29 | 0.100 |
| Assay A (without autoclaving) | 350 | 90 | 0.040 |
| | 800 | 4.6 | 0.025 |

TABLE I-continued

| | Calcination temperature °C. | Specific surface area - m²/g | Porous volume cm³/g |
|---|---|---|---|

It is discovered that autoclaving of a Ceric hydroxide prepared using hydrolysis of a ceric nitrate solution, permits synthesis of a ceric oxide having a large specific surface area, measured after calcination at a temperature of 800° C.

EXAMPLE 2

1. Synthesis of ceric hydroxide

This synthesis is performed according to the operational procedure given in Example 1.1.

2. Autoclaving of the ceric hydroxide

According to the operating procedure described in Example 1, 30 g of the ceric hydroxide as prepared above, placed in suspension in 30 cm³ of a watery ammonia hydroxide 1N solution, is subjected to autoclaving at 200° C. for 4 hours.

Upon completion of the hydrothermal treatment, the precipitate is filtered out using the BÜchner method.

Two fractions of the moist product are then subjected to calcination under the following conditions: 2 hours at 350° C. and 1 hour at 800° C.

The results obtained are collected in Table II. As a comparison, the results of the ceric oxide prepared by direct calcination of the ceric hydroxide, synthesized under 1 (Assay A), are carried over.

TABLE II

| | Calcination temperature °C. | Specific surface area - m²/g | Porous volume cm³/g |
|---|---|---|---|
| Example 2 | 350 | 105 | 0.105 |
| | 800 | 25 | 0.08 |
| Assay A (without autoclaving) | 350 | 90 | 0.040 |
| | 800 | 4.6 | 0.025 |

I claim:

1. A process for obtaining a ceric oxide having a specific surface area of at least 15 m²/g, measured after calcination at a temperature of between 800° and 900° C., said process comprising (i) placing a ceric hydroxide in suspension in water or in a watery decomposable base solution to provide a medium, said ceric hydroxide being represented by formula (I):

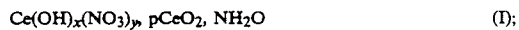

$$Ce(OH)_x(NO_3)_y, pCeO_2, NH_2O \quad \text{(I);}$$

wherein X=4—y, y ranges from 0.35 to 1.35, p ranges from 0 to 2.0, and n ranges from 0 to 20; (ii) heating the medium in a sealed chamber until a temperature and pressure are obtained which are less than the critical temperature and pressure of the medium; (iii) cooling the medium and bringing it back to atmospheric pressure; (iv) separating the resulting ceric hydroxide; and (v) calcining the ceric hydroxide.

2. A process according to claim 1, wherein the ceric hydroxide of formula (I) corresponds to the following formula (Ia):

$$Ce(OH_x)(NO_3)_y, nH_2O \quad \text{(Ia);}$$

wherein $X = 4-y$, y ranges from 0.35 to 0.7, and n ranges from 0 to 20.

3. A process according to claim 2, wherein n ranges from 0 to less than about 10.

4. A process for obtaining a ceric oxide having a specific surface area of at least 15 m²/g, measured after calcination at a temperature of between 800° and 900° C., said process comprising (i) preparing a medium by placing a ceric hydroxide in suspension in water or in a watery decomposable-base solution, said ceric hydroxide being obtained by the hydrolysis of a watery cerium IV salt solution in an acidic medium, separating the resulting precipitate, and thermal treatment as necessary; (ii) heating the medium in a sealed chamber until a temperature or pressure are obtained which are less than the critical temperature and pressure of the medium; (iii) cooling the medium and bringing it back to atmospheric pressure; (iv) separating the resulting ceric hydroxide; and (v) calcining the ceric hydroxide.

5. A process according to claim 4, wherein the hydrolysis is carried out at a temperature ranging from about 70° to about 120° C.

6. A process according to claim 4, wherein the duration of the hydrolysis reaction ranges from 2 to 8 hours.

7. A process according to claim 1, wherein the sealed chamber is an autoclave and the autoclaving temperature ranges from 100° to 350° C.

8. A process according to claim 7, wherein the autoclaving temperature ranges from 150° to 350° C.

9. A process according to claim 1, wherein the pressure ranges from 1 ($1 \times 10^5$ Pa) to 165 ($165 \times 10^5$ Pa) bars.

10. A process according to claim 9, wherein the pressure ranges from 5 to 165 bars.

11. A process according to claim 1, wherein the sealed chamber is an autoclave and autoclaving is carried out from 30 minutes to 6 hours.

12. A process according to claim 1, wherein calcination is carried out at a temperature ranging from 300° to 1000° C.

13. A process according to claim 12, wherein the temperature ranges from 350° to 800° C.

14. A process according to claim 12, wherein calcination is carried out for a period ranging from 2 to 6 hours.

15. Process according to claim 4, wherein the ceric hydroxide is prepared by hydrolysis of a watery ceric nitrate solution.

16. Process according to claim 15, wherein the watery cerium IV salt solution is obtained by the electrochemical oxidation of a cerous nitrate solution or a solution obtained from the action produced by nitric acid on a hydrated ceric oxide.

17. Process according to either of claims 15 and 16, wherein the concentration value of the cerium salt solution expressed in terms of cerium IV lies between 0.3 and 3 moles per liter.

18. Process according to any of claims 15 or 16, wherein the hydrolysis medium is distilled or permuted water.

19. Process according to any of claims 15 or 16, wherein the molar ratio $[H^*]/[Ce^{IV} eq.]$ is more than or equal to 0 and less than or equal to 3.

20. Process according to claim 19, wherein said ratio falls between 0.4 and 2.5.

21. Process according to claim 19, wherein acidity is introduced by means of nitric acid.

22. Process according to claim 19, wherein acidity is introduced by a ceric nitrate solution having an acidity of from 0.01 to 5 N.

23. Process according to any of claims 4, 15 or 16, wherein the proportion of the watery cerium IV salt solution to the hydrolysis medium is such, that the final cerium IV equivalent concentration ranges between 0.1 and 1.0 mole/liter.

24. Process according to claim 23, wherein the final cerium IV equivalent concentration ranges from 0.2 to 0.6 mole/liter.

25. Process according to any of claims 15 or 16, wherein there added, either at one time, gradually, or continuously, the cerium IV salt solution in the water, which may contain acid heated to the reactive temperature; or wherein the cerium IV salt solution and the hydrolysis medium are mixed, then said mixture is continuously stirred and kept at the reactive temperature; or wherein the mixture of the cerium IV salt solution and the hydrolysis medium are mixed simultaneously and continuously, and the mixture is continuously heated to the reactive temperature.

26. Process according to claim 1, wherein the decomposable base is ammonia hydroxide, urea, ammonium hydrogenocarbonate, ammonium carbonate, a primary, secondary, tertiary, or quarternary amine, or mixtures of these.

27. Process according to claim 26, wherein the decomposable base is ammonia hydroxide, a tetraalkylammonium hydroxide, or mixtures of these.

28. Process according to claims 26 and 27, wherein the concentration of the basic solution varies between 1 and 10 N.

29. Process according to any of claims 1, 2, 3, 4, 15, 16, 26 or 27, wherein the concentration of the ceric hydroxide expressed in terms of $CeO_2$ varies between 0.3 and 6 moles/liter.

30. Process according to claim 29, wherein said concentration ranges between 2 and 3 moles/liter.

* * * * *